United States Patent
Yang

(10) Patent No.: US 6,196,158 B1
(45) Date of Patent: Mar. 6, 2001

(54) PET FEEDING DEVICE

(76) Inventor: Shih-Li Yang, No. 2-6, Wen-Hwa Rd., 13rd Lin, Ferng-Chia Li, Hsi-Tun Dist., Taichung (TW)

( * ) Notice: Subject to any disclaimer, the term of this patent is extended or adjusted under 35 U.S.C. 154(b) by 0 days.

(21) Appl. No.: 09/400,877

(22) Filed: Sep. 22, 1999

(51) Int. Cl.[7] ................................................. A01K 5/02
(52) U.S. Cl. ............................................................ 119/51.11
(58) Field of Search .......................... 119/51.11, 51.12, 119/52.1, 53, 57.92

(56) References Cited

U.S. PATENT DOCUMENTS

| | | | |
|---|---|---|---|
| 3,678,902 | * | 7/1972 | Ruth .................................. 119/51.11 |
| 4,422,409 | * | 12/1983 | Walker et al. .................... 119/51.11 |
| 4,437,595 | * | 3/1984 | Stevens et al. .................... 119/51.11 |
| 5,372,093 | * | 12/1994 | Pooshs ............................... 119/51.11 |
| 5,483,923 | * | 1/1996 | Sabbara ............................. 119/51.11 |
| 5,735,231 | * | 4/1998 | Terenzi ............................... 119/51.11 |

* cited by examiner

Primary Examiner—Peter M. Poon
Assistant Examiner—Elizabeth Shaw
(74) Attorney, Agent, or Firm—Rosenberg, Klein & Lee

(57) ABSTRACT

A pet feeding device is disclosed. The pet feeding device includes a hollow casing, a container mounted in the upper part of the casing with an outlet funnel formed on the bottom, a transverse baffle mounted in the mediate portion of the casing, a guide trough mounted in the casing and located under the outlet funnel, and a control unit mounted on the transverse baffle. The control unit includes an electromagnetic actuator mounted on the top of the transverse baffle, a pull shaft attached to the electromagnetic actuator, a time-delay switch for actuating the electromagnetic actuator, a pivot rod mounted on the transverse baffle, a cover plate pivotally mounted on the pivot rod and having a first end located under the outlet funnel and a second end located above the transverse baffle and attached to the pull shaft, and a spring for retaining the first end of the cover plate under the outlet funnel.

3 Claims, 4 Drawing Sheets

PET FEEDING DEVICE

BACKGROUND OF THE INVENTION

The present invention relates to a pet feeding device.

People often raise pets such as dogs, cats or the like. However, it is usually necessary to pour dry food into a container such as a bowl at the same time each day so as to feed the pets, thereby causing inconvenience. The owner must have someone come in to feed the pets or board them at a kennel when he of she leaves home for a few days for vacation or business. The present invention has arisen to mitigate and/or obviate the above problems.

BRIEF SUMMARY OF THE INVENTION

In accordance with one aspect of the present invention, a pet feeding device comprises a hollow casing, a container mounted in the upper part of the casing with an outlet funnel formed on the bottom, a transverse baffle mounted in the mediate portion of the casing, a guide trough mounted in the casing and located under the outlet funnel, and a control unit mounted on the transverse baffle.

The control unit includes an electromagnetic actuator mounted on the top of the transverse baffle, a pull shaft mounted in the electromagnetic actuator, a time-delay switch for actuating the electromagnetic actuator, a pivot rod mounted on the transverse baffle, a cover plate pivotally mounted on the pivot rod and having a first end located under the outlet funnel and a second end located above the transverse baffle and attached to the pull shaft, and a spring for retaining the first end of the cover plate under the outlet funnel.

Further benefits and advantages of the present invention will become apparent after a careful reading of the detailed description with appropriate reference to the accompanying drawings.

DETAILED DESCRIPTION OF THE INVENTION

Figure 1:
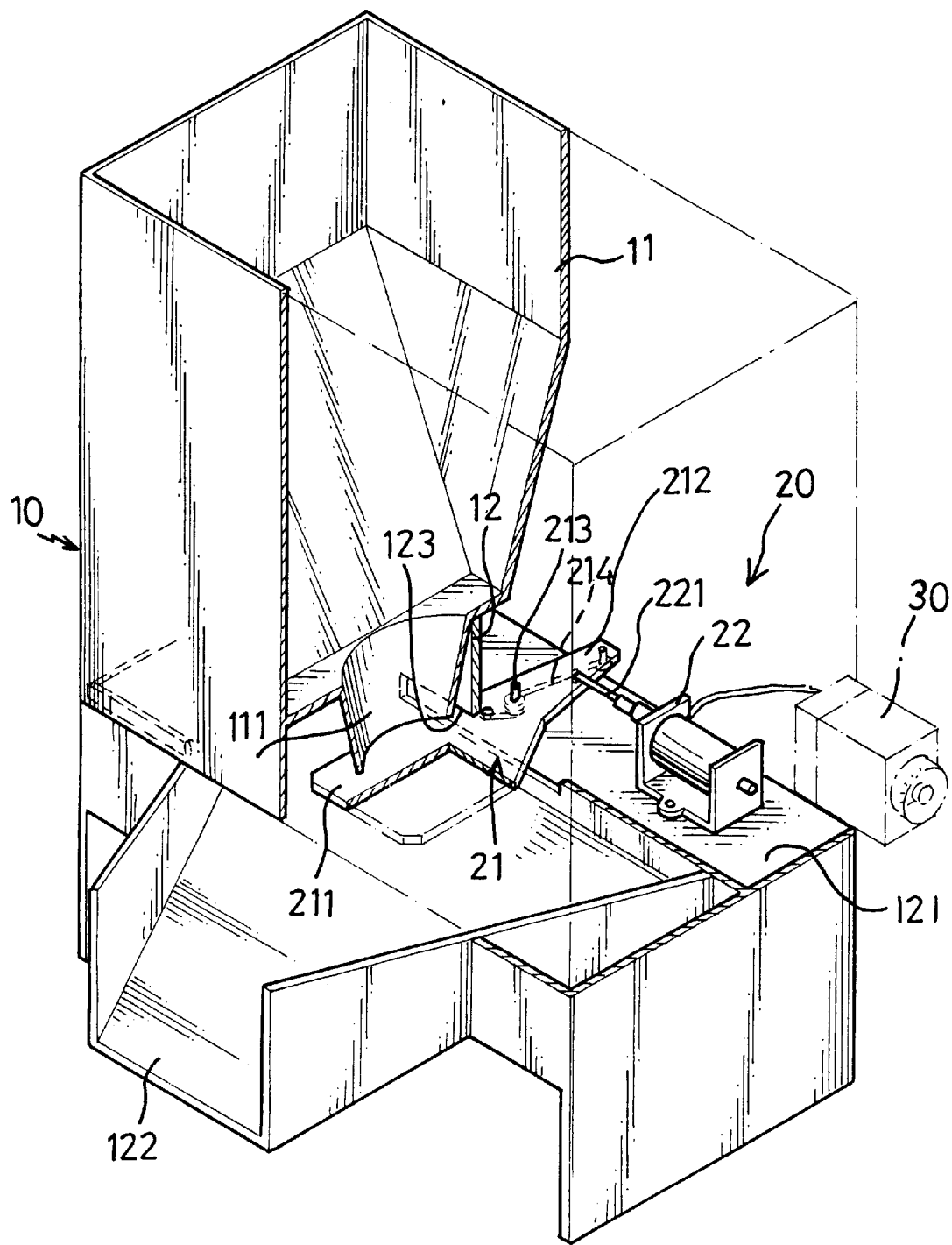
FIG. 1 is a perspective view in partial section of a pet feeding device in accordance with the present invention.
Figure 2:
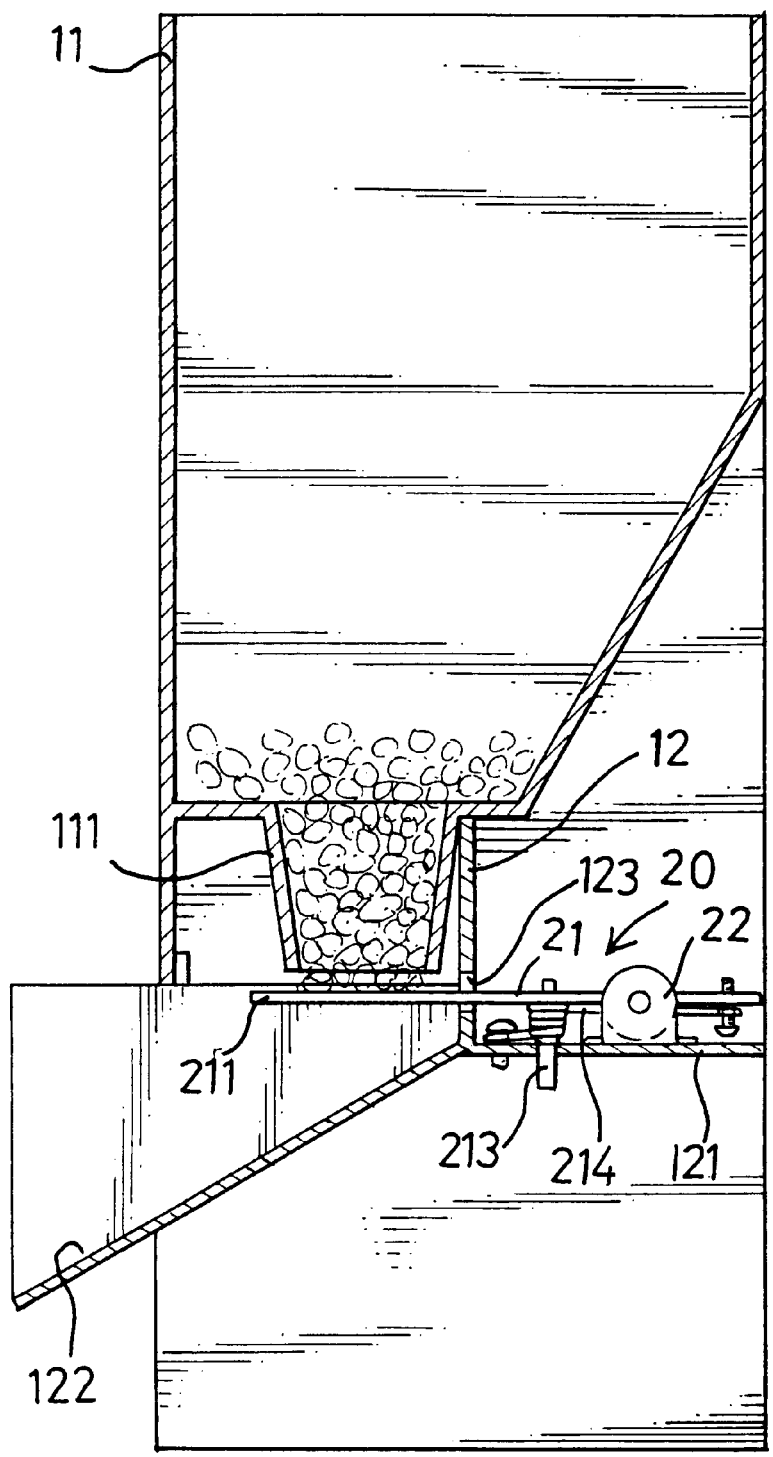
FIG. 2 is a side plan cross-sectional view of the pet feeding device in FIG. 1.

Referring to the drawings and initially to FIGS. 1 and 2, a pet feeding device in accordance with the present invention comprises a hollow casing (10), a container (11) mounted in the upper part of the casing (10) with an outlet funnel (111) formed on the bottom thereof, a transverse baffle (121) mounted in the mediate portion of the casing (10), a guide trough (122) mounted in the casing (10) and located under the outlet funnel (111), and a control unit (20) mounted on the transverse baffle (121).

The control unit (20) includes an electromagnetic actuator (22) mounted on the top of the transverse baffle (121), a pull shaft (221) attached to the electromagnetic actuator (22), a time-delay switch (30) connected to a timer (not shown) to initiate the electromagnetic actuator (22), a pivot rod (213) mounted on the transverse baffle (121), a cover plate (21) pivotally attached to the pivot rod (213) and having a first end (211) located under the outlet funnel (111) and a second end (212) located above the transverse baffle (121) and attached to the pull shaft (221), and a spring (214) for retaining the first end (211) of the cover plate (21) under the outlet funnel (111).

The spring (214) is mounted on the pivot rod (213) and has a first end attached to the second end (212) of the cover plate (21) and a second end attached to the transverse baffle (121).

The pet feeding device further comprises a longitudinal baffle (12) mounted between the transverse baffle (121) and the guide trough (122) and containing a slot (123) to allow passage of the cover plate (21).

Figure 3:
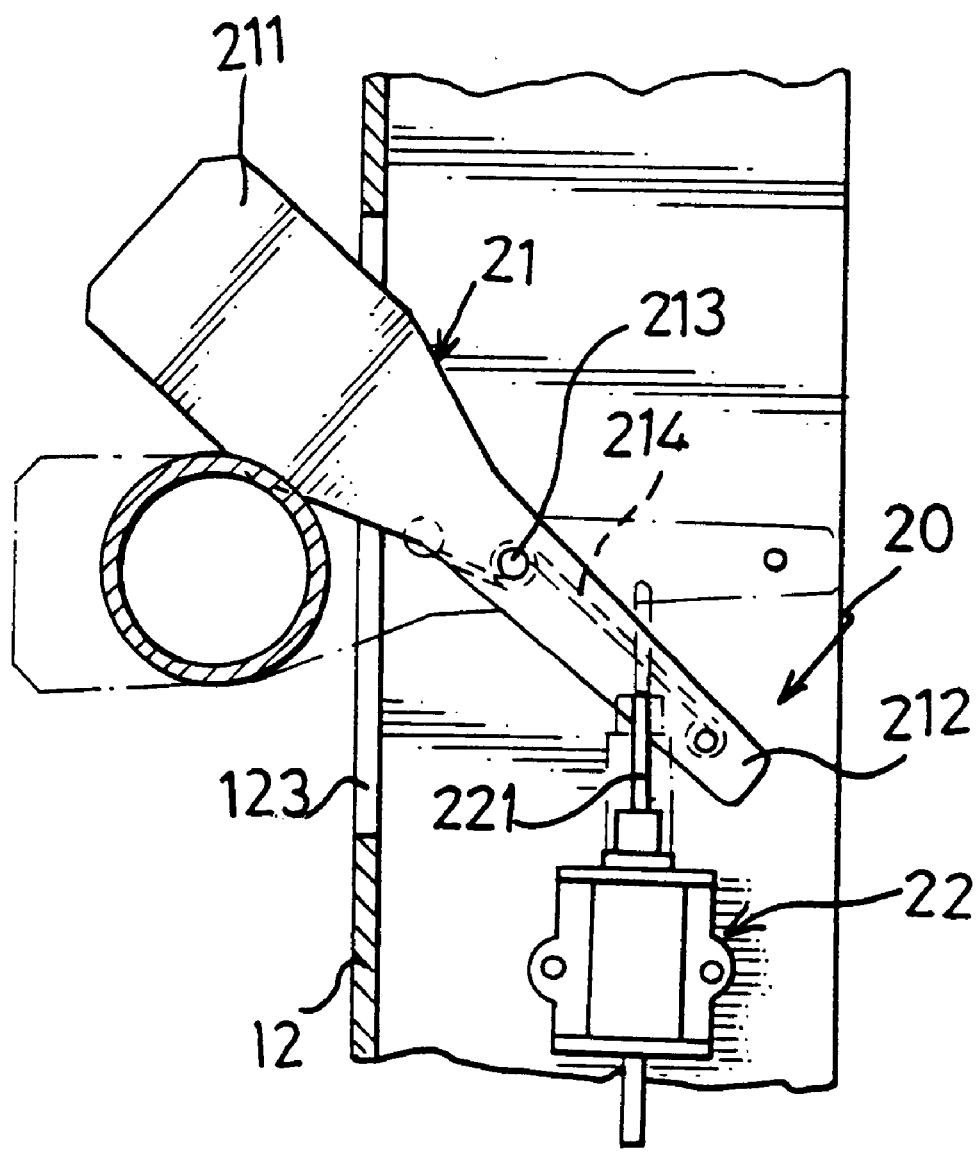
FIG. 3 is an operational top plan view in partial section of the pet feeding device in FIG. 1.
Figure 4:
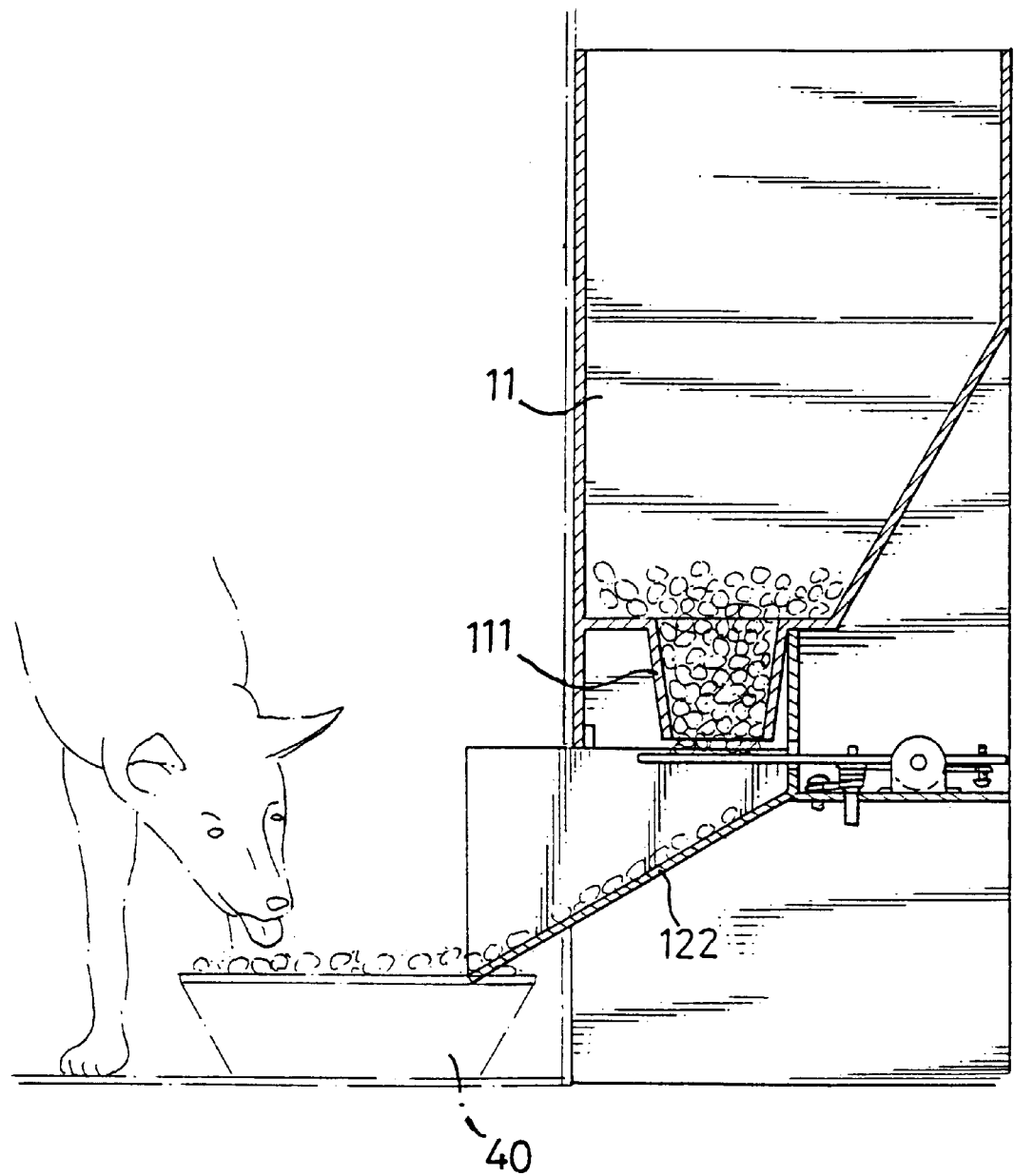
FIG. 4 is an operational side plan view in partial section of the pet feeding device in FIG. 2.

In operation, referring to FIGS. 3 and 4 with reference to FIGS. 1 and 2, the first end (211) of the cover plate (21) is initially located under the outlet funnel (111), thereby preventing the dry food in the container (11) from falling through the outlet funnel (111). The time-delay switch (30) is then actuated by the timer to actuate the electromagnetic actuator (22) which moves the pull shaft (221) inward to move the second end (212) of the cover plate (21), thereby pivoting the cover plate (21) about the pivot rod (213) to move the first end (211) of the cover plate (21), thereby connecting the outlet funnel (111) to the guide trough (122) so that the dry food in the container (11) is delivered from the container (11) to a bowl (40) through the outlet funnel (111) and the guide trough (122). The operation of the time-delay switch (30) is terminated after a pre-set time, thereby stopping the operation of the electromagnetic actuator (22) so that the cover plate (21) is returned to its original position by the restoring action of the spring (214) so as to position the first end (211) of the cover plate (21) under the outlet funnel (111), thereby again closing the outlet funnel (111) to stop dropping the dry food.

The parts of the pet feeding device such as the cover plate (21), the spring (214), etc. are easily manufactured and assembled, thereby decreasing the cost of fabrication. In addition, the cover plate (21) is pivoted by the electromagnetic actuator (22), thereby effectively decreasing the noise.

It should be clear to those skilled in the art that further embodiments may be made without departing from the scope of the present invention.

What is claimed is:

1. A pet feeding device comprising:

a hollow casing (10);

a container (11) mounted in the upper part of said hollow casing (10) with an outlet funnel (111) formed on the bottom;

a transverse baffle (121) mounted in the mediate portion of said hollow casing (10);

a guide trough (122) mounted in said hollow casing (10) and located under said outlet funnel (111); and a control unit (20) mounted on said transverse baffle (121) and including an electromagnetic actuator (22) mounted on the top of said transverse baffle (121), a pull shaft (221) attached to said electromagnetic actuator (22), a time-delay switch (30) for actuating said electromagnetic actuator (22), a pivot rod (213) mounted on said transverse baffle (121), a cover plate (21) pivotally mounted on said pivot rod (213) and having a first end (211) located under said outlet funnel (111) and a second end (212) located above said transverse baffle (121) and attached to said pull shaft (221), and a spring (214) for retaining said first end (211) of said cover plate (21) under said outlet funnel (111).

2. The pet feeding device in accordance with claim 1 further comprising a longitudinal baffle (12) mounted between said transverse baffle (121) and said guide trough (122) and containing a slot (123) to allow passage of said cover plate (21).

3. The pet feeding device in accordance with claim 1, wherein said spring (212) is mounted on said pivot rod (213) and has a first end attached to said second end (212) of said cover plate (21) and a second end attached to said transverse baffle (121).

\* \* \* \* \*